United States Patent [19]

Shomura et al.

[11] 3,940,479
[45] Feb. 24, 1976

[54] NOVEL ANTIBIOTIC BN-109 SUBSTANCE, ITS PRODUCTION AND USE

[75] Inventors: Takashi Shomura, Yokohama; Shoji Omoto, Tokyo; Shinji Miyado, Yokohama; Hiroshi Watanabe, Yokohama; Shigeharu Inouye, Yokohama; Yujiro Yamada, Yokohama; Taro Niida, Yokohama, all of Japan

[73] Assignee: Meiji Seika Kaisha, Ltd., Tokyo, Japan

[22] Filed: July 17, 1974

[21] Appl. No.: 489,104

[52] U.S. Cl. .............................. 424/118; 195/80 R
[51] Int. Cl.² .......................................... A61K 35/00
[58] Field of Search .................... 424/118; 195/80 R

[56] References Cited
OTHER PUBLICATIONS

Miller, The Pfizer Handbook of Microbial Metabolites, McGraw–Hill Book Co., Inc., N.Y., N.Y., 1961, pp. 373–375.

*Primary Examiner*—Jerome D. Goldberg
*Attorney, Agent, or Firm*—Oblon, Fisher, Spivak, McClelland & Maier

[57] ABSTRACT

A BN-109 substance producing strain of the genus Bacillus is cultivated under an aerobic condition to produce and accumulate BN-109 substance in a culture medium. The BN-109 substance is isolated from the culture broth and purified, and proved to be a novel antibiotic. The BN-109 is effective in the treatment and prevention of swine scours.

5 Claims, 2 Drawing Figures

NOVEL ANTIBIOTIC BN-109 SUBSTANCE, ITS PRODUCTION AND USE

BRIEF SUMMARY OF THE INVENTION

The present invention relates to a novel antibiotic designated BN-109 substance and to a process for preparing same. Furthermore, it relates to a preparation containing said novel antibiotic as effective ingredient for the treatment and prevention of swine scours.

The novel BN-109 substance of the present invention is produced by cultivating a BN-109 producing strain of the genus Bacillus under an aerobic condition. The BN-109 producing strains include the BN-109 strain and its variants. The BN-109 strain was isolated from a soil sample collected in Sengokuhara, Hakone, Kanagawa-ken, Japan, and recognized as a strain of *Bacillus polymyxa*.

According to the present invention, the producing strains are cultivated in a medium containing the nutrients commonly used for cultivation of microorganism, at 25°– 30°C.

The BN-109 substance of the present invention is effective in inhibiting growth of Gram-negative bacteria but shows very low toxicity against animals. Particularly, the BN-109 substance is hardly absorbed from digestive tracts and there is little possibility of residue in edible tissues.

The BN-109 substance of the present invention shows effect in the treatment as well as prevention of swine scours.

The swine scours include neonatal colibacillosis, white scours (delayed colibacillosis) etc. These scours inflict a great loss on live-stock industry. Up to now, some known antibiotics have been applied to the treatment and prevention of these scours but the effectiveness was usually weakened by the appearance of resistant strains.

OBJECT OF THE INVENTION

An object of the present invention is to provide a novel antibiotic named BN-109 substance. Another object of the present invention is to provide a process of preparing the BN-109 substance, which comprises cultivation of a BN-109 substance-producing strain of the genus Bacillus under an aerobic condition, and recovery of the accumulated BN-109 substance from the culture broth.

A further object of the present invention is to provide a preparation containing the novel BN-109 substance as active ingredient for the treatment and prevention of swine scours. Said preparation does not give rise to the appearance of resistance pathogenic bacteria, and the active BN-109 substance is neither absorbed from intestinal tracts nor distributed in edible tissues.

DETAILED EXPLANATION OF THE INVENTION

Figure 1:
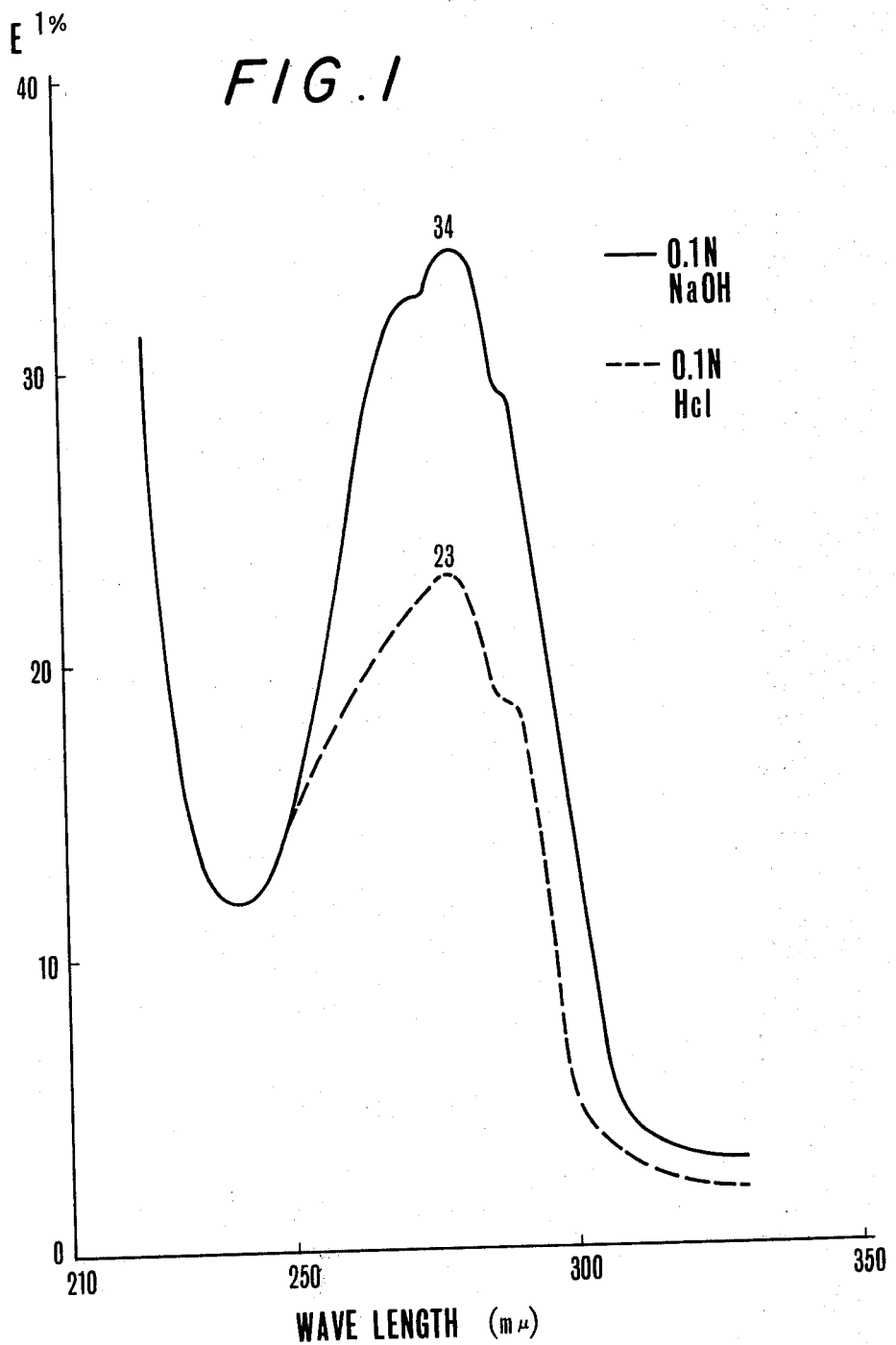
FIG. 1 is the ultraviolet absorption spectrum of the BN-109 substance.

The present inventors recognized that when a strain belonging to the genus Bacillus was cultivated under an aerobic condition, a substance designated BN-109 substance, which is strongly effective in the inhibition of the growth of Gram-negative bacteria, was produced and accumulated in the medium and that, after isolation, purification and characterization, this substance was a novel antibiotic different from any one which had been known. The present invention is thus accomplished.

The Bacillus bacteria employed by the present invention are the ones that can produce BN-109 substance in an amount enough to be isolated from the culture media. An example of the producing Bacillus bacteria used in the present invention is the one identified as a *Bacillus polyxa* (strain No. BN-109), which was isolated from a soil sample collected in Sengokuhara, Hakone, Kanagawa-ken, Japan.

The bacteriological characteristics of the BN-109 strain are as follows:

a. Morphological characteristics:
   Vegetative cells grown in glucose bouillon agar, 0.8 – 1.0 × 2.0 – 3.5 μ;
   Spores recognized in 2 – 3 day's culture at 28°C, 0.8 – 1.0 × 1.4 – 2.0 μ, ellipsoidal;
   Sporangia central and definitely swollen;
   Gram negative for about one-day's round vegetative cells, variable for older cells.

b. Cultural characteristics:
   Growth occurs on known bacteriological media in 1-3 days at 25° – 35°C; better growth on media containing a sugar, especially glucose.
   1. Common agar plate: Growth scant, but becomes thicker by adding 0.5 – 1.0% of glucose to the medium; colonies adherent, raised; No water-soluble or -insoluble pigments produced;
   2. Broth liquid: Scant surface growth, sediment;
   3. Gelatin broth stab: Saccate liquefication proceeds from the third day at 23°C;
   4. Milk: Coagulation with slight acidification.

c. Physiological characteristics:
   1. Reduction of nitrate: Positive (28°C, 7 days);
   2. MR (methyl red) test: Negative (28°C, 7 days);
   3. VP (Voges-proskauer) test: Positive (28°C, 3 days);
   4. Production of indole: Negative within 7 days at 28°C;
   5. Hydrolysis of starch: Positive (28°C, 5 days);
   6. Oxidase test: Negative (28°C, 2 days);
   7. Catalase test: Positive (28°C, 2 days);
   8. Lecithinase reaction: Negative (28°C, 2 days);
   9. Production of pigments: No soluble or insoluble pigments produced;
   10. Salt resistance: No growth in a bouillon containing 5% NaCl;
   11. Growth temperature: 37°C; no growth at 42°C;
   12. O-F test (Heuleifson's medium): Acid is produced aerobically and anaerobically from glucose; gas also produced pronouncedly in anaerobic culture;
   13. Utilization of sugars according to Heuleifson's procedure:
       Utilizable with acid production: Glucose, mannitol, xylose, lactose, sucrose, salicin, glycerin, L-arabinose;
       Utilizable without acid production: Sorbitol, inositol;
   14. Sensitivity towards antibiotics (disc method):
       Sensitive: Streptomycin, kanamycin, vistamycin, penicillin, cephalolidin, tetracyclin, erythromycin, chloramphenical, nalidixic acid;
       Resistant: Polymyxin B, colistin.

Comparing the above-mentioned bacteriological characteristics of the BN-109 strain with the identified strains listed in Bergey's Manual of Determinative Bacteriology, 7th Edition, 1957, the BN-109 strain can be considered as, 1. belonging to the genus Bacillus from the viewpoint that it is a rod-shaped aerobic bacterium capable of producing spores and is catalase-positive;
2. belonging to Group II of the genus Bacillus, as proposed by Smith et al. from the morphological characteristics of its sporangia and spores;
3. belonging to *Bacillus polymyxa* or *Bacillus mercerans* for the production of acid and gas anaerobically from glucose in the O-F test;
4. closer to *Bacillus polymyxa* between the two species as it is positive in VP reaction and does not produce crystalline dextrine;
5. belonging to *Bacillus polymyxa* from the viewpoint of good growth and production of adherent, raised colonies on glucose-bouillon agar, similarity in utilization of sugars and coagulation of milk.

Consequently, the present inventors named the BN-109 substance-producing strain *Bacillus polymyxa* BN-109 to distinguish it from the known strains. The *Bacillus polymyxa* BN-109 has been deposited in the American Type Culture Collection (ATCC) under the number 31037 and in the Fermentation Research Institute, Agency of Industrial Science and Technology, Ministry of International Trade and Industry of Japan under the number, FERM-P No. 2129.

Similarly to the other bacteria of the genus Bacillus, the BN-109 strain varies easily in its properties. Variation can be caused artificially by, for example, UV, X-ray, high-frequency wave, radiation, and chemicals. Therefore, all this kind of variants can be used in the process of the present invention so long as they have the ability to produce BN-109 substance.

According to the process of the present invention, the above mentioned strains of bacteria are cultivated in a medium containing the nutrients that are utilizable by known microorganisms. The nutrient sources can be the known materials conventionally used in the cultivation of the Bacillus bacteria. Examples of the carbon-source are glucose, sucrose, starch, glycerin, millet jelly molasses, soybean oil, etc. Examples of the nitrogen-source are soybean powder, wheat germ, meat extract, peptone, yeast extract, corn steep liquor, ammonium sulfate, sodium nitrate, et al. Additionally, inorganic salts, such as calcium carbonate, sodium chloride, potassium chloride, phosphate, etc., as well as those organic and inorganic substances that enhence bacterial growth and the production of BN-109 substance can be adequately incorporated into the medium if required.

For cultivation, as with the ordinary production of antibiotics, liquid culture, especially submerged culture is most suitable. The cultivation is effected under an aeration condition at an optimal temperature of 25° – 35°C, especially for most cases, around 28°C. Production of BN-109 substance reaches maximum in 30–96 hours in both shake-culture and tank-culture.

Methods for the assay of BN-109 substance in the present invention is as follows:

The assay medium (pH 6.0) was composed of 0.5% peptone, 0.3% meat extract, and 2.0 % agar. *Escherichia coli* was used as test organism. A result of the assay showed that within the concentration range of 125 mcg/ml to 1,000 mcg/ml of BN-109 substance, a linear relationship existed between the logarithm of said concentration and the diameter of inhibition zones; said zone diameters ranged from 10.0 to 19.6 mm (paper disc method). BN-109 substance is accumulated mainly in culture solution. Extraction of the active substance from the culture solution includes adsorption by a cation exchange resin such as Amberlite IRC-50 (H type)(a registered Trade Name of an ion-exchange resin as produced by Rohm & Haas Co., U.S.A.), Amberlite CG-50 (H type) (a registered Trade Name of an ion-exchange resin as produced by Rohm & Haas Co., U.S.A.), Dowex 50 W (H type) (a registered Trade Name of an ion-exchange resin as produced by Dow Chemical Co., U.S.A.), etc., and elution with an alkaline solution, a mixture of mineral acid and acetone-water, etc.

For example, BN-109 substance can be effectively isolated from culture broth filtrate by subjecting the filtrate to a column of Amberlite IRC-50 (H type) to adsorb the active substance onto the resin, washing the column with water, and eluting the substance with ammonia water. The crude BN-109 substance thus obtained is further charged to a column of CM-Sephadex C-25 (H type)(ion-exchangeable gel filtration agent, produced by Pharmacia Co., of Sweden) and eluted with sodium chloride solutions. The active fractions are pooled and extracted with n-butanol. The n-butanol layer which contains the active substance is evaporated in vacuum with addition of water to obtain a concentrated aqueous solution. The precipitate of BN-109 substance obtained thereby is collected by filtration, washed with water and dried in a desicator. A white powder of pure free base of BN-109 substance is thus obtained.

The BN-109 substance of the present invention has the following physical and chemical properties.

1. Appearance: White powder for the free base;
2. Melting point: 186° – 188°C;
3. Solubility: Hardly insoluble in common organic solvents and water, slightly soluble in dilute acid, dilute alkali, acetic acid, dimethylformamide and dimethylsulfoxide, soluble in acidic methanol and acidic ethanol.
4. Mobility: Moves towards cathode on filter-paper electrophoresis (pH 1.9, 3500 V, 15 minutes) for 6.5 cm, showing a behavior characteristic of basic substance. (However, alanine moved 9.6 cm).
5. Rf value: A single spot appears on each thinlayer chromatograph, the Rf values of the spots are shown as follows.

| Solvent systems | Rf value |
| --- | --- |
| n-Butanol:acetic acid:$H_2O$ (2:1:1) | 0.68 |
| n-Butanol:acetic acid:$H_2O$ (4:1:5, upper layer) | 0.38 |
| n-Butanol:pyridine:acetic acid:$H_2O$ (6:4:1:3) | 0.66 |

Figure 2:
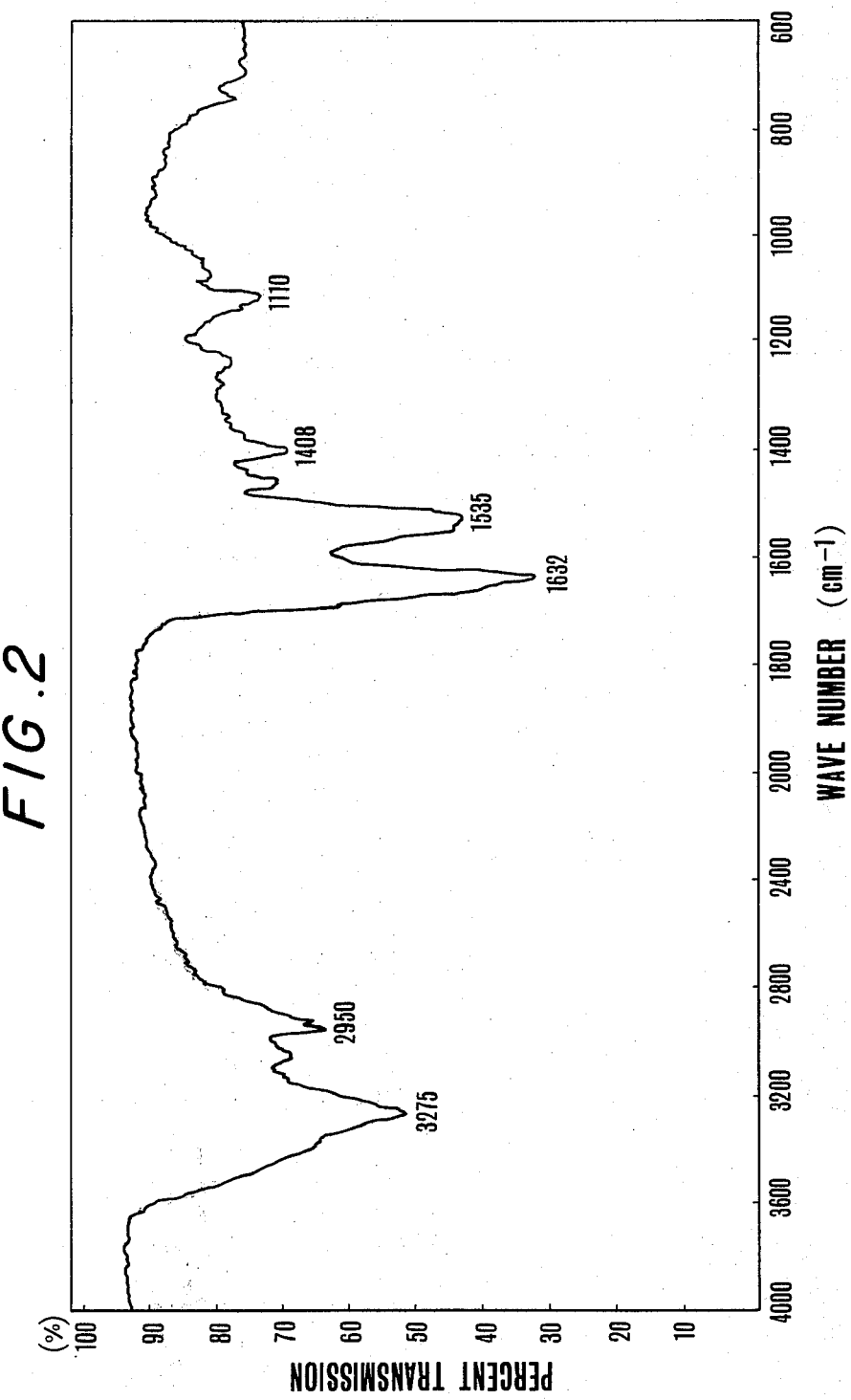
FIG. 2 is its infrared absorption spectrum (KBr).

6. Specific rotatory power: Shows a value of −4° with a 0.5% solution in the mixture solvent of methanol and acetic acid (1:1).
7. Ultraviolet absorption apectrum: (See FIG. 1). Characteristic absorption maximum at 279 m$\mu$ [($E_{1\ cm}^{1\%}$ = 34) in 0.1N NaOH, ($E_{1\ cm}^{1\%}$ = 23) in 0.1N HCl].
8. Infrared absorption spectrum: (See FIG. 2). Characteristic absorption bands at 3275, 2950, 1632, 1535, 1408, 1110 ($cm^{-1}$).
9. Color reaction: Positive ninhydrin, Ehrlich, Dragendorff, negative SAKAGUCHI, Pauly, and Trevelian.

10. Elementary analysis: C 52.73%, H 7.27%, N 12.77%.

11. Amino acid analysis: BN-109 substance was hydrolyzed with 6 N-HCl at 105°C for 48 hours and the amino acid composition of the hydrolysate was analyzed by an amino acid analyzer (Japan Electron Optics Laboratory Ltd. JLC-5AH). Tryptophan was determined separately by UV absorption method. The result is shown as follows (The figures in the parenthesis denote molar ratios): α, γ-diamino butyric acid(4), serine(2), glutamic acid(1), glycine(1), alanine(1), valine(3), phenylalanine(1), tryptophan(2), and an unknown amino acid(1).

12. Fatty acid analysis: BN-109 substance contained 30% of acidic ether-soluble fatty acid.

13. Molecular weight: As estimated from the results of amino acid analysis and fatty acid analysis, the molecular weight of BN-109 substance fell into the range of 1900–2200.

It is clear from the above-mentioned physical and chemical properties that BN-109 substance is a peptide antibiotic. Although many peptide antibiotics produced by bacteria have been reported, the ones that contain α,γ-diamino-butyric acid as BN-109 substance does are restricted to four groups of antibiotics, namely, polymyxins (A, $B_1$, $B_2$, D, E, M, P), colistins (A, B), circulins (A, B) and polypeptins. Comparison of amino acid compositions among these known antibiotics and BN-109 substance is shown in Table 1.

This table shows that BN-109 substance is clearly different from the known antibiotics and that BN-109 substance is a novel antibiotic.

Table 1

| Antibiotics | α,Γ-Diamino butyric acid | Leucine | Iso-leucine | Phenyl-alanine | Threo-nine | Valine | Serine | Trypto-phan | Gluta-mic acid | Gly-cine | Ala-nine | Unknown aminoic acid |
|---|---|---|---|---|---|---|---|---|---|---|---|---|
| BN-109 substance | 4 | | | 1 | | 3 | 2 | 2 | 1 | 1 | 1 | 1 |
| Polymyxin A | 6 | 1 | | | 3 | | 2 | | | | | |
| "  $B_1$ | 6 | 1 | | 1 | 2 | | | | | | | |
| "  $B_2$ | 6 | 1 | | 1 | 2 | | | | | | | |
| "  D | 5 | 1 | | | 3 | 1 | | | | | | |
| "  E | 6 | 2 | | | 2 | | | | | | | |
| "  M | 6 | 1 | | | 3 | | | | | | | |
| "  P | 6 | | | 1 | 3 | | | | | | | |
| Colistin A (polymyxin $E_1$) | 6 | 2 | | | 2 | | | | | | | |
| Colistin B (polymyxin $E_2$) | 6 | 2 | | | 2 | | | | | | | |
| Circulin A | 6 | 1 | 1 | | 2 | | | | | | | |
| "  B | 6 | 1 | 1 | | 2 | | | | | | | |
| Polypeptin | 3 | 2 | 1 | 1 | 1 | 1 | | | | | | |

The biological activities of BN-109 substance are shown as follows.

1. Antibacterium spectrum: BN-109 substance of the present invention shows inhibitory activity against a variety of Gram-negative bacteria, as shown in Table 2.

Table 2

Antimicrobial spectrum of BN-109 substance

| Test organisms | MIC (mcg/ml) | Media |
|---|---|---|
| Escherichia coli | 0.78 | I |
| Escherichia coli IAM 1264 | 0.39 | I |
| Escherichia coli IAM 1239 | 0.78 | I |
| Escherichia coli communis | 0.39 – 0.78 | V |
| Escherichia coli 0 – 16 | 1.56 | V |
| Escherichia coli 0 – 20 | 1.56 | V |
| "  0 – 78 | 1.56 | V |
| Escherichia coli 0 – 83 | 1.56 | V |
| "  0 – 138 | 1.56 | V |
| "  0 – 139 | 1.56 | V |
| "  0 – 142 | 1.56 | V |
| Escherichia coli, streptomycin-resistant | 0.78 | I |
| Escherichia coli, kanamycin-resistant | 0.78 | I |
| Escherchia coli, chloramphenicol-resistant | 0.78 | I |
| Escherichia coli, carrying R-factor | 0.78 | I |
| Klebsiella pneumoniae | 0.78 | I |
| Proteus vulgaris | 6.25 | I |
| Alcaligenes faecalis IFO 13111 | 12.5 | I |
| Alcaligenes bronchsepticus A-19 | 1.56 | V |
| Alcaligenes bronchsepticus 5 | 1.56 | V |
| Alcaligenes bronchsepticus 42 | 1.56 | V |
| Psedomonas aeruginosa | 100 | I |
| Bacillus subtilis ATCC 6633 | 6.25 | I |
| Staphylococcus aureus 209 p | 25 | I |
| Sarcina lutea | 25 | I |
| Xanthomonas oryzae | <0.1 | II |
| Mycobacterium smegmatis | >100 | III |
| Candida albicans | >100 | IV |
| Pyricularia oryzae | >100 | IV |
| Salmonella typhimurium 0-901-W | 1.56 | V |
| Salmonella pullorum 20 | 3.12 | V |
| Vibrio coli SD-358 | 0.78 | VI |
| "  34E | 1.56 | VI |

Media: I, Bouillon medium; II, Na-glutamate medium; III, Blycerin-bouillon medium; IV, Sabouraud medium; V, Heart infusion agar medium; VI, Brain heart infussion agar medium containing 10% horse blood.

2. Toxicity: The acute toxicity of BN-109 substance of the present invention is very low. Thus, when administered to abdominal cavity, none of the test mice died during an observation period of months with a dose of 10 mg/Kg, though that of 50 mg/Kg killed all of the animals. The $LD_{50}$ values were more than 1,000 mg/Kg for oral administration and around 25 mg/Kg for intraperitoneal administration; this indicated that absorption of BN-109 substance by digestive ducts is, if any, very low. Therefore, BN-109 substance can be safely applied to the treatment and prevention of swine scours.

3. Appearance of resistant bacteria: As apparent from Table 3, resistant variants could hardly be acquired from the representative bacteria.

Table 3

| Test bacteria | Acquisition of resistance to BN-109 substance in vitro (MIC in mcg/ml) | | | | | | | | | | | | |
|---|---|---|---|---|---|---|---|---|---|---|---|---|---|
| | Generations | | | | | | | | | | | | |
| | 0 | 1 | 2 | 3 | 4 | 5 | 6 7 | 8 | 9 | 10–13 | 14 | 15–20 |
| E. coli 0-20 | 1.56 | 3.12 | 6.25 | — | — | — | — — | — | — | — | — | — |
| E. coli p-55 | 1.56 | 6.25 | — | — | — | — | — — | — | — | — | 12.5 | — |
| E. coli S-56 R 6 | 3.12 | — | — | 6.25 | — | — | — — | — | — | — | 12.5 | — |
| S. typh. 0-901-W | 1.56 | 3.12 | — | — | — | — | — — | — | — | 6.25 | 12.5 | — |
| S. typh. 4-2 | 12.5 | — | — | — | — | — | — 25 | — | — | — | 50 | — |
| S. pull. 47 | 6.25 | 12.5 | — | — | — | — | — — | — | 25 | — | — | 50 |
| Sta aureus DH-18S | 50 | — | — | — | — | 100 | — — | — | 200 | — | — | — |
| B. sub. p cl-219 | 25 | 50 | — | — | — | 100 | — — | — | 200 | — | — | — |
| Al. bron. 202 | 1.56 | 3.12 | — | — | — | — | — — | — | — | — | 6.25 | — |

4. Effectiveness towards swine scours Table 4 and 5, stemmed from Experiment 1 and 2, show that BN-109 substance has pronounced effectiveness in the treatment of swine scours.

EXPERIMENT 1

Effects on the Treatment of Swine Scours

One part of the novel antibiotic, BN-109 substance, was grinded in a mortar and mixed with four parts of liquid sugar to prepare a paste. The paste preparation was used in a field clinical examination. The swine scours in this experiment are attributable to pathogenic *Escherichia coli* infected naturally. The result is shown in the following Table 4.

1. As a rule, the dose which was divided into separate treatment, one in the morning (M), another in the evening (E).
2. Classification of the symptom: +++ watery excretion, ++ muddy excretion, + soft excretion.
3. When the symptom was (−), treatment was stopped and relapse was checked.
4. Test animals: Swine aged 29 days.

EXPERIMENT 2

Effects on the Treatment of Swine Scours

Experiment 1 was repeated with swine of different age. The result is shown in Table 5.

Table 5

| | | | | Effects on the treatment of swine scours | | | | | | | | |
|---|---|---|---|---|---|---|---|---|---|---|---|---|
| No. | Sex | Age (day) | Body weight(kg) | dose g/day | mg/kg/day | Symptoms and effectiveness | | | | | | Conclusion |
| | | | | | | 1 | 2 | 3 | 4 | 5 | 6 | 7 | |
| 1 | ♀ | 12 | 3 | 4 | 260 | ++ | ++ | + | + | + | — | — | cured |
| 2 | ♀ | 28 | 8.5 | 10 | 325 | +++ | +++ | + | + | — | — | — | " |
| 3 | ♀ | 10 | 3 | 4 | 260 | + | + | — | — | — | — | — | " |
| 4 | ♂ | 10 | 3.5 | 4 | 230 | +++ | ++ | ++ | — | — | — | — | " |
| 5 | ♂ | 29 | 10.5 | 10 | 190 | ++ | + | + | + | + | — | — | " |
| 6 | ♀ | 10 | 4 | 4 | 200 | ++ | + | + | — | — | — | — | " |
| 7 | ♂ | 21 | 8.5 | 10 | 350 | ++ | ++ | ++ | + | + | — | — | " |
| 8 | ♂ | 20 | 7.9 | 6 | 150 | +++ | +++ | +++ | + | — | — | — | " |
| 9 | ♀ | 23 | 7.5 | 6 | 160 | +++ | +++ | +++ | +++ | ++ | ++ | + | not cured |
| 10 | ♂ | 8 | 3 | 4 | 260 | + | + | + | — | — | — | — | cured |
| 11 | ♀ | 13 | 4 | 4 | 200 | ++ | ++ | + | + | + | — | — | " |
| 12 | ♂ | 19 | 6.5 | 6 | 185 | +++ | +++ | ++ | — | — | — | — | " |
| 13 | ♂ | 19 | 6 | 6 | 200 | +++ | +++ | ++ | ++ | + | — | — | " |
| 14 | ♀ | 15 | 6 | 6 | 200 | + | + | — | — | — | — | — | " |
| 15 | ♀ | 15 | 5.5 | 6 | 220 | + | + | — | — | — | — | — | cured |
| 16 | ♀ | 14 | 3.8 | 4 | 220 | +++ | +++ | +++ | + | + | — | — | " |
| 17 | ♂ | 13 | 4.5 | 4 | 180 | ++ | + | + | — | — | — | — | " |
| 18 | ♂ | 13 | 5 | 4 | 160 | ++ | ++ | ++ | — | — | — | — | " |

1. A dose was divided into 2 separate treatments, one used in the morning (M) and another in the evening (E).
2. Symptoms: +++ watery excretion, ++ muddy excretion, + soft excretion.
3. When symptom became (−), dose was stopped and Table 4

| No. | Sex | Body weight (kg) | Dose (g/day) | Effects on the treatment of swine scours | | | | | | | | | | | | | Conclusion |
|---|---|---|---|---|---|---|---|---|---|---|---|---|---|---|---|---|---|
| | | | | 1st day | | 2nd day | | 3rd day | | 4th day | | 5th day | | 6th day | | 7th day | |
| | | | | M. | E. | M. | E. | M. | E. | M. | E. | M. | E. | M. | E. | M. E. | |
| 1 | ♀ | 9 | 5 | ++ | +++ | +++ | ++ | ++ | ++ | + | — | — | — | — | — | — — | cured |
| 2 | ♀ | 10 | 5 | +++ | +++ | +++ | ++ | + | ++ | ++ | + | + | — | — | — | — — | " |
| 3 | ♀ | 8 | 5 | ++ | ++ | ++ | ++ | ++ | — | — | — | — | — | — | — | — — | " |
| 4 | ♀ | 6 | 3 | +++ | +++ | +++ | ++ | +++ | +++ | +++ | +++ | +++ | ++ | + | + | + — | " |
| 5 | ♀ | 5.5 | 3 | + | + | — | — | — | — | — | — | — | — | — | — | — — | " |
| 6 | ♂ | 9.5 | 5 | +++ | ++ | +++ | + | + | + | + | — | — | — | — | — | — — | " |
| 7 | ♂ | 5.5 | 3 | ++ | ++ | ++ | + | + | + | + | — | — | — | — | — | — — | " | relapse was checked.

These experiments show that BN-109 substance can be applied effectively to the treatment of swine scours.

EXAMPLE 1

*Bacillus polymyxa* BN-109, ATCC NO. 31037, previously cultivated on an agar slant (pH 7) composed of 1.0% glucose, 1.0% dry bouillon and 2.0% agar at 28°C for 48 hours was inoculated in a 500 ml liquid medium (pH 7) containing 2.0% glycerin, 1.0% soybean powder, 0.5% peptone, 0.2% ammonium chloride, 0.25% calcium carbonate and 0.5% sodium chloride and cultivated with shaking at 28°C for 20 hours to prepare a seed culture. The seed culture thus obtained was transferred to 20 liters of the same liquid medium and cultivated under aeration and stirring (a 50 liter-jar fermentor was used) at 28°C for 48 hours. After cultivation, the medium was heated at 100°C for 10 minutes and filtered to obtain 18 liters of filtrate (activity: 400 mcg/ml).

The filtrate thus obtained was adjusted to pH 7 and passed through a column (2 liters) of a cationic-exchange resin, Amberlite IRC-50 (H type), to adsorb the active substance on the resin. The column was washed with water and eluted with 0.5-N aqueous ammonia. The first 5 liters of the eluate was discarded but the next 4 liters was taken and concentrated to 2 liters under a reduced pressure. This was then adjusted to pH 3.0 with HCl and passed through a column (200 ml) of CM-Sephadex C-25 (H type), whereby the active substance was adsorbed on the sephadex. The column was washed with 1 liter of water and the active substance was eluted with 0.5-M NaCl. The active fractions were pooled (250 ml) and extracted with n-butanol; the active substance transferred to the butanol layer. The butanol layer was concentrated under a reduced pressure with addition of water until a 20 ml aqueous solution was obtained. The BN-109 substance precipitated. The precipitate was gathered by filtration, washed with water and dried in a desicator, thus obtained 1.9 grams of BN-109 substance in free base form as white powder.

EXAMPLE 2

Spore suspension of *Bacillus polymyxa* BN-109, ATCC No. 31037, was inoculated into 5 liters (50 Sakaguchi flasks) of a liquid medium (pH 7) containing 2.0% glucose, 0.5% meat extract, 1.5% soybean powder, 0.2% ammonium chloride, 0.3% calcium carbonate, and cultivated by shaking culture at 30°C for 54 hours. Afterwards, the liquid medium was heated at 120°C for 1 minute and filtered to obtain 4.3 liters of culture filtrate (activity: 320 mcg/ml).

The filtrate was treated in the same manner as Example 1 and 470 mg of BN-109 substance (free base) was obtained as white powder.

What we claim is:

1. An antibiotic BN-109 substance, which is effective in inhibiting the growth of Gram-negative bacteria and having the following properties:

Appearance: White powder as a free base;

Solubility: Insoluble in common organic solvents and water, slightly soluble in diluted acid and alkaline, acetic acid dimethylformamide and dimethyl sulfoxide, and soluble in acidic methanol and acidic ethanol;

Mobility on filter paper electrophoresis: Behaves as an alkaline substance;

Rf values on TLC:
    0.86 (n-butanol-acetic acid-water (2:1:1)),
    0.38 (n-butanol-acetic acid-water (4:1:5, upper layer)),
    0.66 (n-butanol-pyridine-acetic acid-water (6:4:1:3));

$[\alpha]_D^{25}$ ($c$ 0.5, methanol-acetic acid (1:1)): $-4°$;

Maximum UV absorption bands: Found at 279 m$\mu$ ($E_{1cm}^{1\%} = 34$, in 0.1 N-NaOH, $E_{1cm}^{1\%} = 23$ in 0.1 N-HCl);

IR absorption bands: Found at 3275, 2590, 1632, 1535, 1408, 1110 (cm$^{-1}$).

Color reactions:
    Positive ninhydrin, Ehrich and Dragendorff;
    Negative Sakaguchi, Pauly and Trevelian;

Elementary analysis: C, 52.73%; H, 7.27%; N, 12.77%;

Amino acid composition: $\alpha,\gamma$-diamino butyric acid(4), serine(2), glutamic acid(1), glycine(1), alanine(1), valine(3), phenylalanine(1), tryptophan(2), and unknown animo acid(1);

Fatty acids: Contain 30% of acid ether-soluble fatty acids;

Molecular weight: 1900 to 2200

2. A process for preparing an antibiotic substance from *Bacillus polymyxa* BN-109, ATCC 31037 which comprises the steps of:

cultivating said BN-109 Bacillus ATCC 31037 strain in an aqueous nutrient medium containing sources of assimilable carbon and assimilable nitrogen which support growth of said strain and enhanced production of said antibiotic at a pH of 6 to 7 at 25° to 35°C under aerobic conditions until a sufficient amount of antibiotic is formed; and recovering said antibiotic from the culture medium.

3. The process according to claim 2, wherein the source of assimilable carbon is glucose, sucrose, starch, glycerin, millet jelly, molasses or soybean oil, the source of nitrogen is soybean powder, wheat germ, meat extract, peptone, yeast extract, corn steep liquor, ammonium sulfate or sodium nitrate and the inorganic salts are selected from the group consisting of calcium carbonate, sodium chloride, potassium chloride and phosphate.

4. The process according to claim 2 wherein said antibiotic is recovered from the culture broth by filtering the medium, subjecting the filtrate to a column of a cation exchange resin, and extracting the antibiotic from the resin.

5. The process according to claim 2, wherein said antibiotic is extracted by eluting said resin with ammonia water.

* * * * *